(12) United States Patent
Casler et al.

(10) Patent No.: US 7,343,267 B1
(45) Date of Patent: Mar. 11, 2008

(54) METHODS AND SYSTEMS FOR STATISTICAL BASED MONITORING AND POWER MANAGEMENT

(75) Inventors: David C. Casler, Montrose, CO (US); Joan L. Mitchell, Longmont, CO (US); Piet C. De Groen, Rochester, MN (US)

(73) Assignees: International Business Machines Corporation, Armonk, NY (US); Mayo Foundation For Medical Education And Research, Rochester, MN (US)

( * ) Notice: Subject to any disclaimer, the term of this patent is extended or adjusted under 35 U.S.C. 154(b) by 0 days.

(21) Appl. No.: 11/533,860

(22) Filed: Sep. 21, 2006

(51) Int. Cl.
*H04N 11/02* (2006.01)

(52) U.S. Cl. .................................. 702/189
(58) Field of Classification Search ........... 702/189
See application file for complete search history.

(56) References Cited

U.S. PATENT DOCUMENTS

2006/0045185 A1* 3/2006 Kiryati et al. ......... 375/240.16

OTHER PUBLICATIONS

Casler, et al., U.S. Appl. No. 11/265,512, "Using Statistics to Locate Signals in Noise", filed Nov. 3, 2005.

* cited by examiner

*Primary Examiner*—Tung S. Lau
(74) *Attorney, Agent, or Firm*—Patterson & Sheridan, LLP; William J. McGinnis

(57) ABSTRACT

Embodiments of the present invention provide devices and techniques for detecting anomalies in monitored environments. In one embodiment of the invention, data may be acquired by monitoring an environmental variable. Based on the acquired data, statistics may be calculated which model the behavior of the environmental variable. Based on the calculated statistics, a long-term behavior and a short-term behavior of the statistics may also be calculated. A difference between the long-term statistics and the short-term statistics may then be calculated. If the difference between the long-term statistical behavior and short-term statistical behavior exceeds a dynamic or predefined threshold, an action may be taken.

20 Claims, 14 Drawing Sheets

FIG. 4

MEAN

$$\text{FOM} = \frac{1}{N} \sum_{k=0}^{N-1} x_k$$

VARIANCE

$$\text{FOM} = \frac{1}{N-1} \sum_{k=0}^{N} x_k^2$$

VARIANCE OF THE AUTOCORRELATION

$$\text{FOM} = \frac{1}{N-1} \sum_{k=0}^{N-1} \left[ \frac{1}{N} \sum_{i=0}^{N-k-1} x_i x_{i+k} \right]^2$$

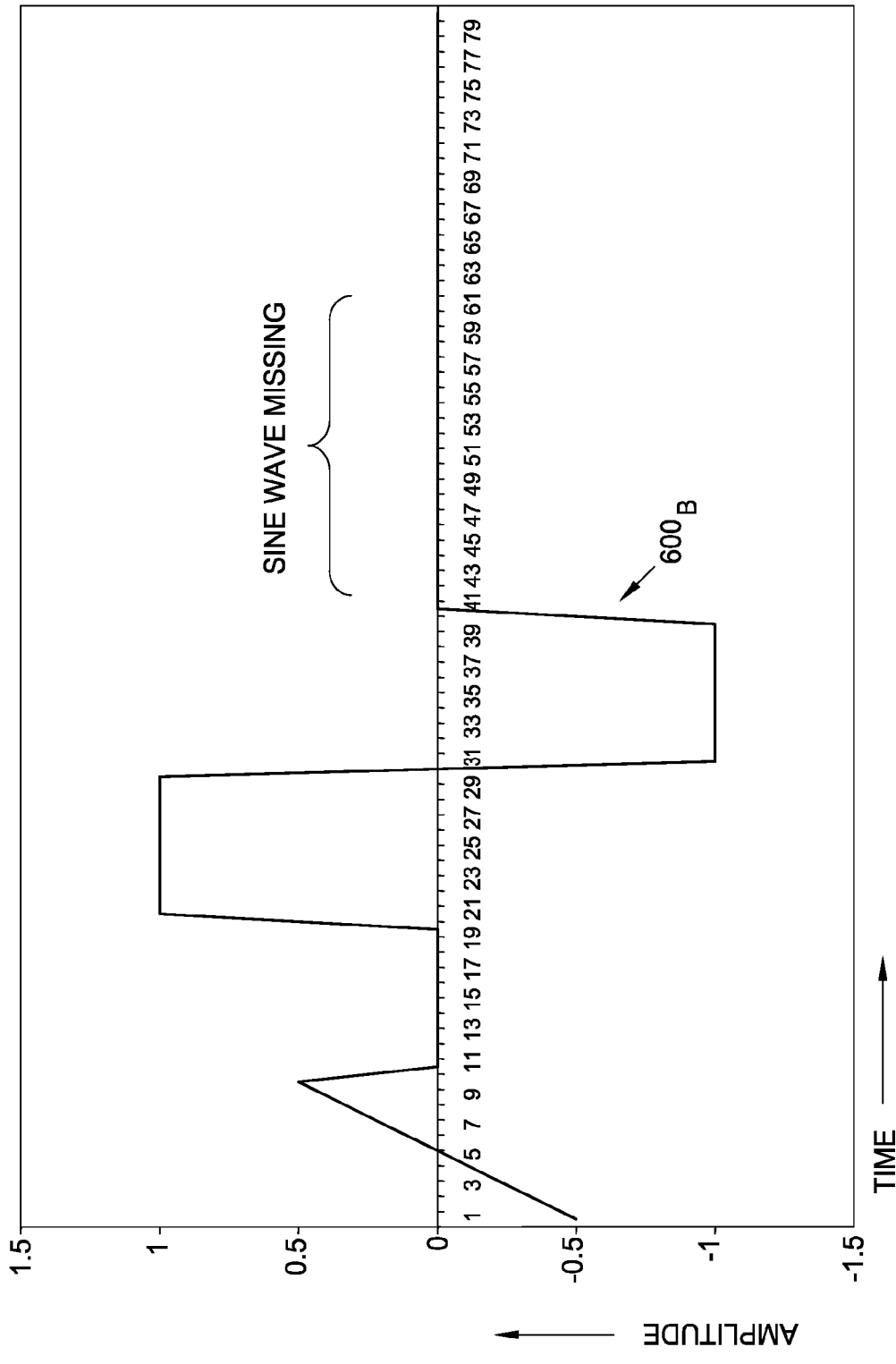

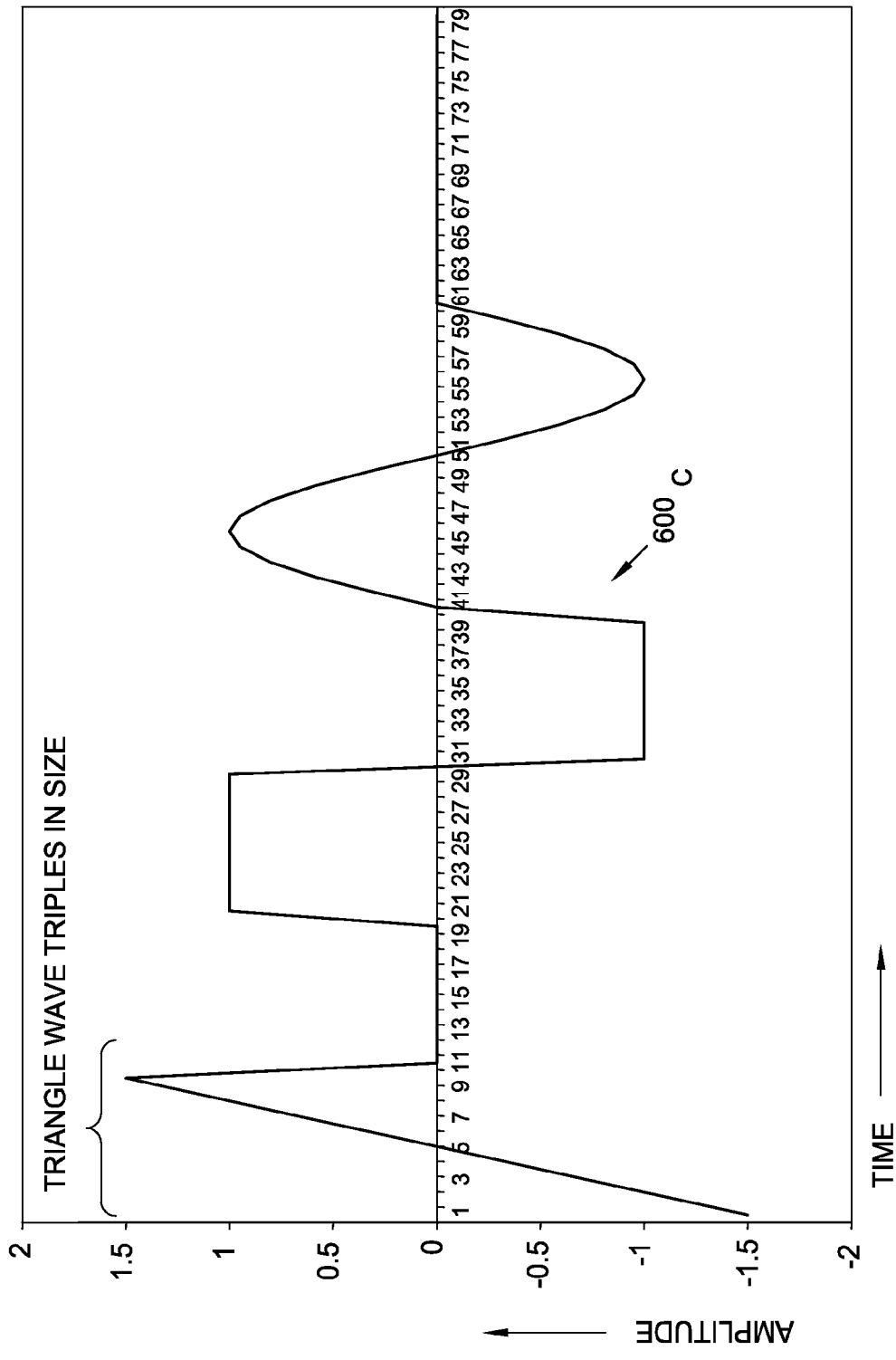

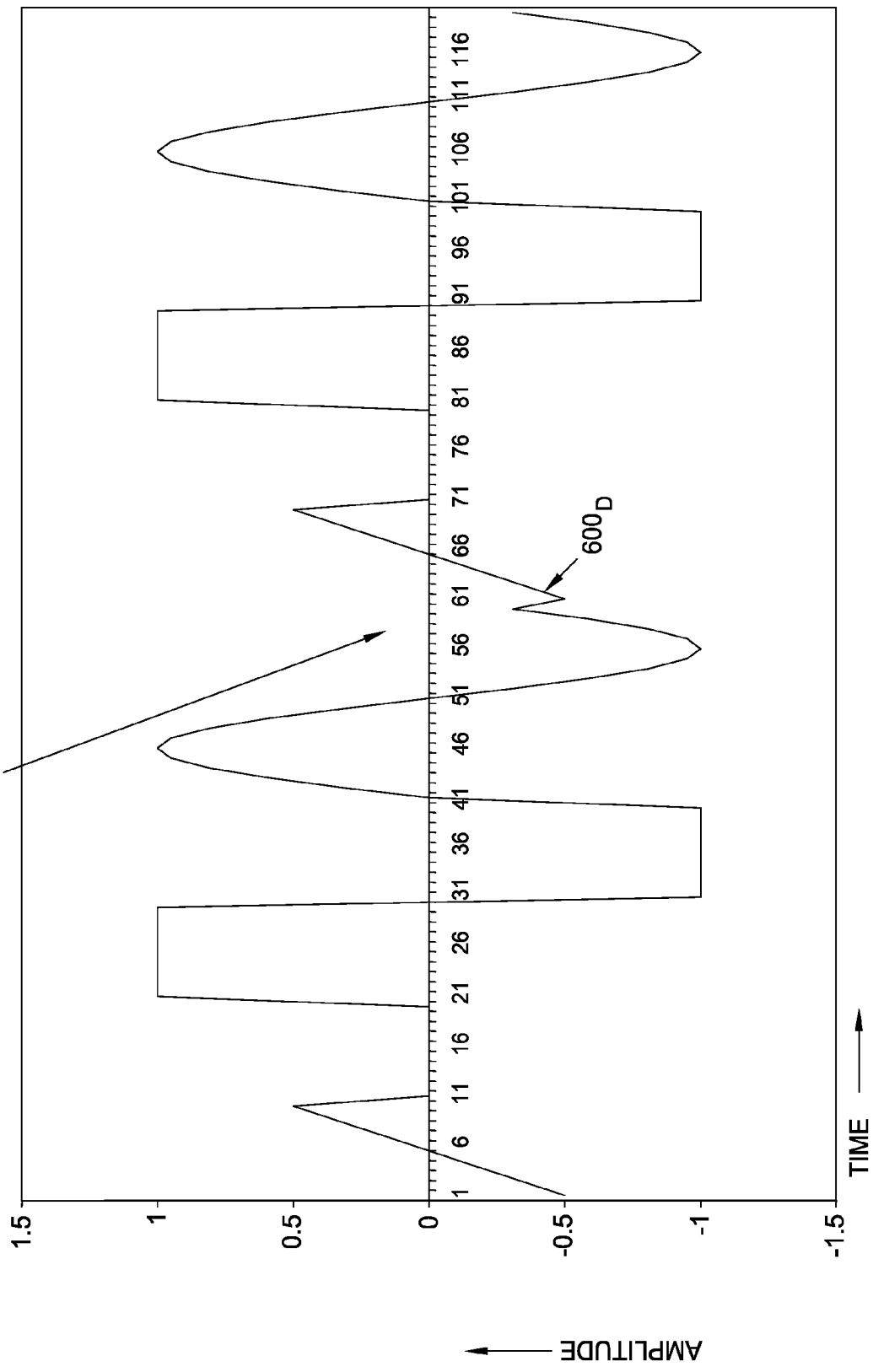

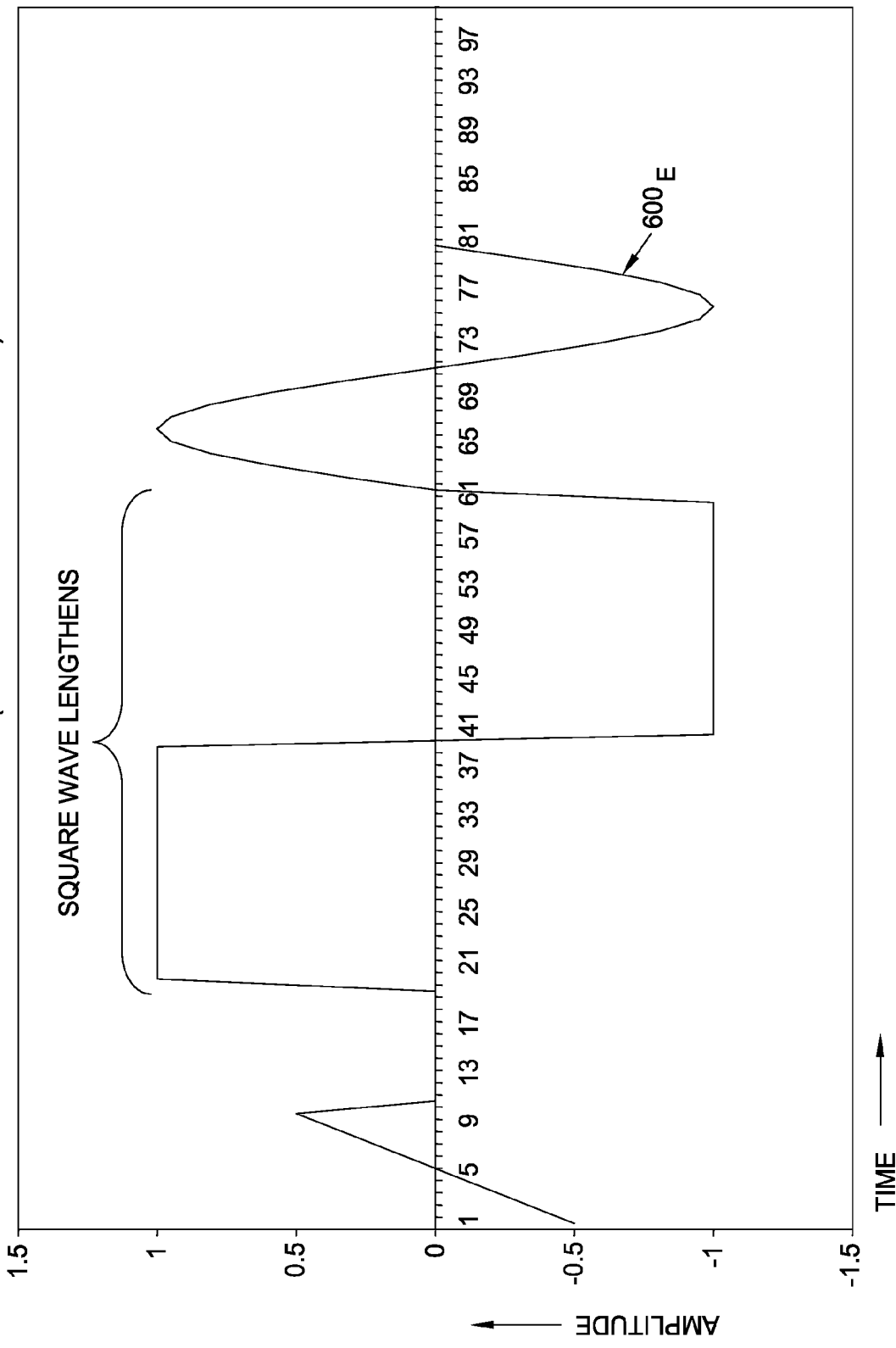

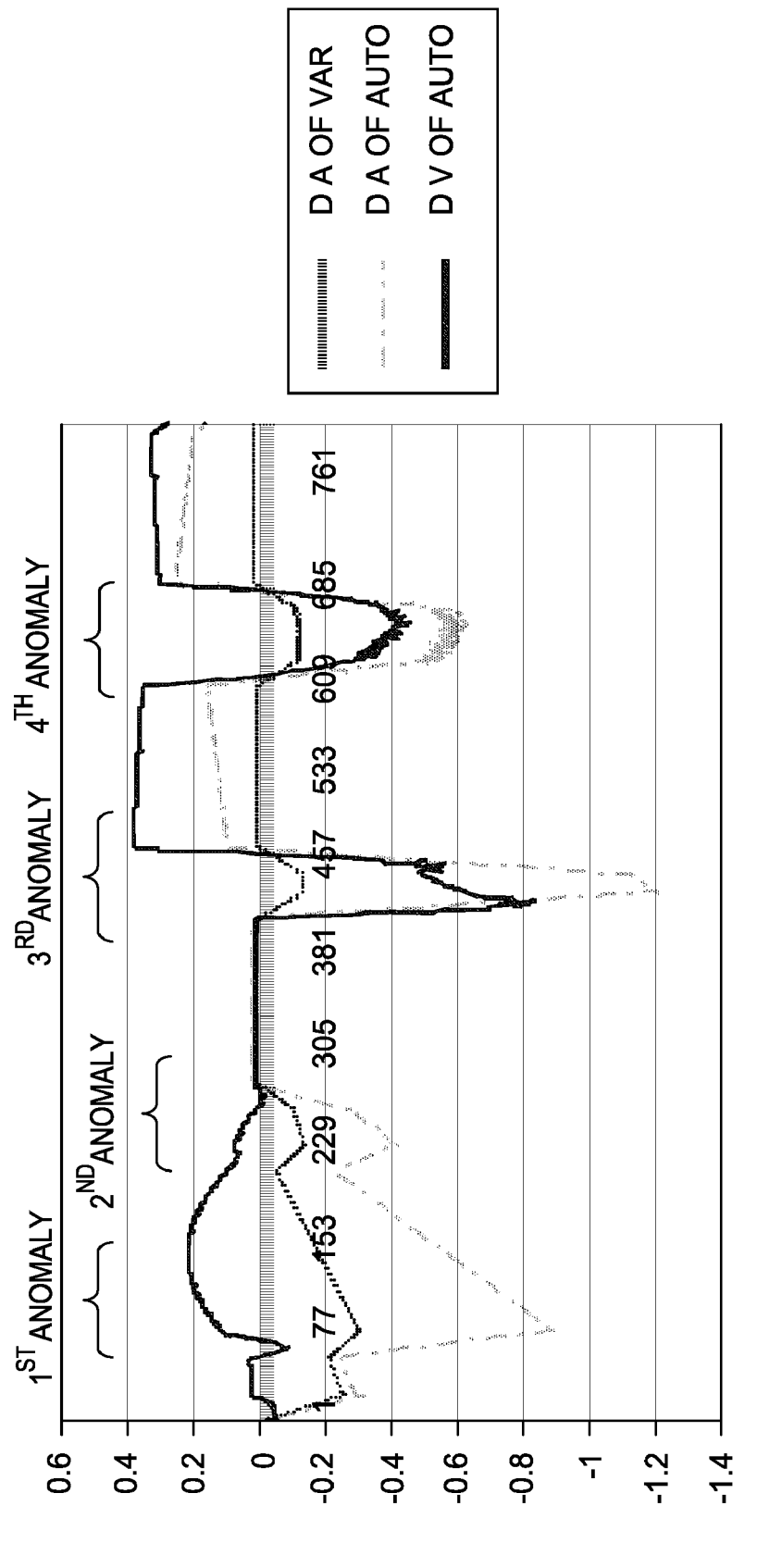

METHODS AND SYSTEMS FOR STATISTICAL BASED MONITORING AND POWER MANAGEMENT

BACKGROUND OF THE INVENTION

1. Field of the Invention

Embodiments of the present invention provide techniques and devices for detecting anomalies in a monitored environment, and transmitting information in response to detecting the anomalies.

2. Description of the Related Art

Often it is desirable to monitor an environment to detect anomalies or changes in the environment. The environment may have many changing variables which indicate an overall behavior of the environment. These changes in the environment may necessitate some sort of action to prevent catastrophic consequences brought on by the changes. By monitoring the environment, one may be able to alert an individual to take action.

For example, it may be desirable to monitor the flow of a river to detect changes in the flow of the river. Changes in the flow of a river may indicate an approaching flash flood. A device monitoring river flow may alert a meteorologist who may issue a flash flood warning to the public.

Currently devices exist which monitor environments continuously to detect anomalies or changes in the environment. These devices must be preloaded with a predefined value in order to detect changes in the environment. For example, the predefined value may be a threshold, which, if exceeded by a monitored environment variable may cause a device to generate a signal to alert an individual to take action. For example, a device which monitors the heartbeat of a patient may generate an alert if the heartbeat exceeds a predefined rate. In another implementation, the predefined value may be a pattern of variable behavior. If the behavior of a monitored variable matches the pattern, a device may alert an individual to take action. For example, a device which monitors the heart rhythm of a patient may look for a particular pattern in the heart rhythm. If the pattern is matched, the device may generate an alert.

A disadvantage to these devices is that the abnormal behavior of the environmental variable being monitored must be known in advance in order to detect anomalous behavior. If changes which may be of interest to an individual monitoring the environment occur, but those changes do not exceed the predefined threshold or match the predefined pattern, then the individual monitoring the environment will not be alerted to the change in environmental variable. Therefore, anomalous behavior which is not known in advance will go undetected.

Another approach to detecting anomalies in monitored environments may be to continuously transmit the signals corresponding to monitored environmental variables to a base unit monitored by an individual. Monitoring devices which continuously transmit data consume a great deal of power.

Accordingly, in order to meet the power demands of such devices, a large power supply must be available. Current solutions to the problem are to provide a large number of batteries with the unit, or to connect the monitoring device to a power source such as a wall power outlet or solar cells. The problem with these solutions is that a connection to a wall power outlet, solar cells or a large battery pack may limit the mobility of the device.

Therefore, there exists a need for an improved device which may monitor environmental variables for anomalies and in the event of an anomaly, transmit information.

SUMMARY OF THE INVENTION

The present invention generally includes improved devices and techniques for monitoring environmental variables for anomalies and in the event of an anomaly, transmitting information.

One embodiment of the invention provides a method of detecting an anomaly in a signal. The method generally comprises calculating a first value based on a set of statistics which model the signal, wherein the first value is calculated over a first period of time; calculating a second value based on the set of statistics which model the signal, wherein the second value is calculated over a second period of time; calculating a difference between the first value and the second value; comparing the difference to a threshold wherein the difference exceeding the threshold is indicative of the anomaly in the signal; and if the difference is exceeds the threshold, performing an action wherein performing the action requires a relative increase in power consumption.

Another embodiment of the invention provides a computer readable medium containing a program for detecting an anomaly in a signal. The program, when executed, performs an operation generally comprising calculating a first value based on a set of statistics which model the signal, wherein the first value is calculated over a first period of time; calculating a second value based on the set of statistics which model the signal, wherein the second value is calculated over a second period of time; calculating a difference between the first value and the second value; comparing the difference to a threshold wherein the difference exceeding the threshold is indicative of the anomaly in the signal; and if the difference is equal to or exceeds the threshold, performing an action wherein performing the action requires an increase in power consumption.

Another embodiment of the invention provides an apparatus for detecting an anomaly in a signal. The apparatus generally comprises a sensor and a processor. Wherein the processor is generally configured to perform the operations comprising: calculating a first value based on a set of statistics which model the signal, wherein the first value is calculated over a first period of time; calculating a second value based on the set of statistics which model the signal, wherein the second value is calculated over a second period of time; calculating a difference between the first value and the second value; comparing the difference to a threshold wherein the difference exceeding the threshold is indicative of the anomaly in the signal; and if the difference exceeds the threshold, performing an action wherein performing the action requires an increase in power consumption.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates exemplary statistical algorithms used to model behavior of a signal, according to one embodiment of the invention.

FIGS. 6A-6E illustrate portions of an exemplary signal to be sampled by a monitoring device, according to one embodiment of the invention.

FIGS. 8 and 10 illustrate differences between long-term statistics and short-term statistics calculated from a sampled exemplary signal, according to one embodiment of the invention.

DETAILED DESCRIPTION OF THE PREFERRED EMBODIMENTS

Figure 1:
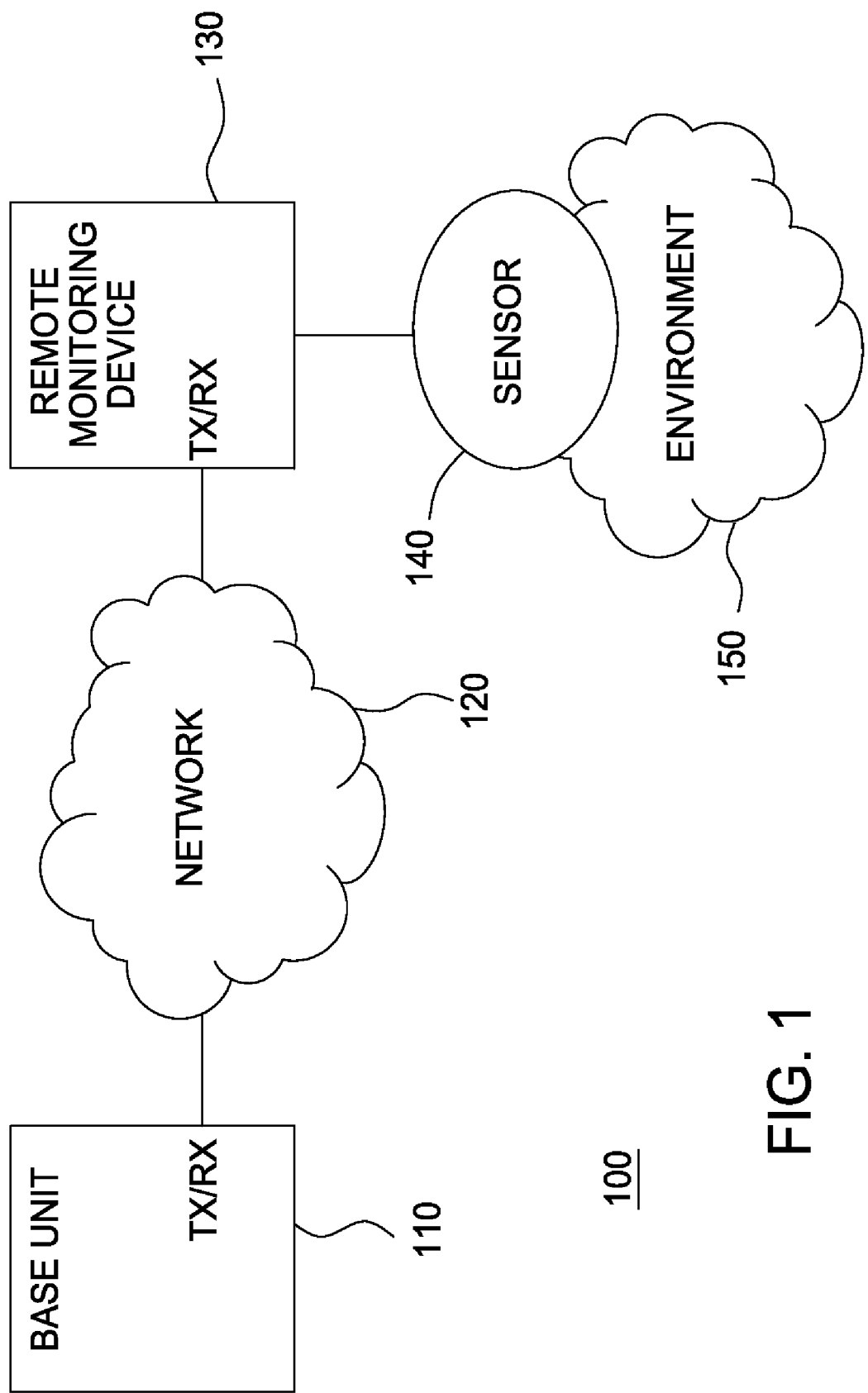
FIG. 1 is a block diagram of an exemplary system for monitoring an environment, according to one embodiment of the invention.

Embodiments of the present invention provide devices and techniques for detecting anomalies in monitored environments. In one embodiment of the invention, data may be acquired by monitoring an environmental variable. Based on the acquired data, statistics may be calculated which model the behavior of the environmental variable. Based on the calculated statistics, a long-term behavior and a short-term behavior of the statistics may also be calculated. A difference between the long-term statistics and the short-term statistics may then be calculated. If the difference between the long-term statistical behavior and short-term statistical behavior exceeds a dynamic or predefined threshold, an action may be taken.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the system 100 described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 is a block diagram of an exemplary system 100 for monitoring an environment 150, according to one embodiment of the invention. The system 100 may include a base unit device 110 for receiving alerts and other information which may be transmitted from a remote monitoring device 130. For example, the base unit device 110 may be a computer system monitored by an individual responsible for taking action in response to an anomaly which occurs in the monitored environment 150. The base unit device 110 may be connected to the remote monitoring device 130 by means of a network 120. Any network capable of transmitting and receiving information may be sufficient for embodiments of the present invention. The network may be a hard wired network (e.g. telephone line, network cable, etc.) or may be a wireless network (e.g., GSM, CDMA, 802.11, etc.). The remote monitoring device 130 may also be connected to a sensor 140, which may be located within the environment so as to monitor an environmental variable or variables. The sensor 140 may collect information or data related to the environmental variable. The sensor 140 may monitor a single environmental variable or may monitor a plurality of environmental variables.

Figure 2:
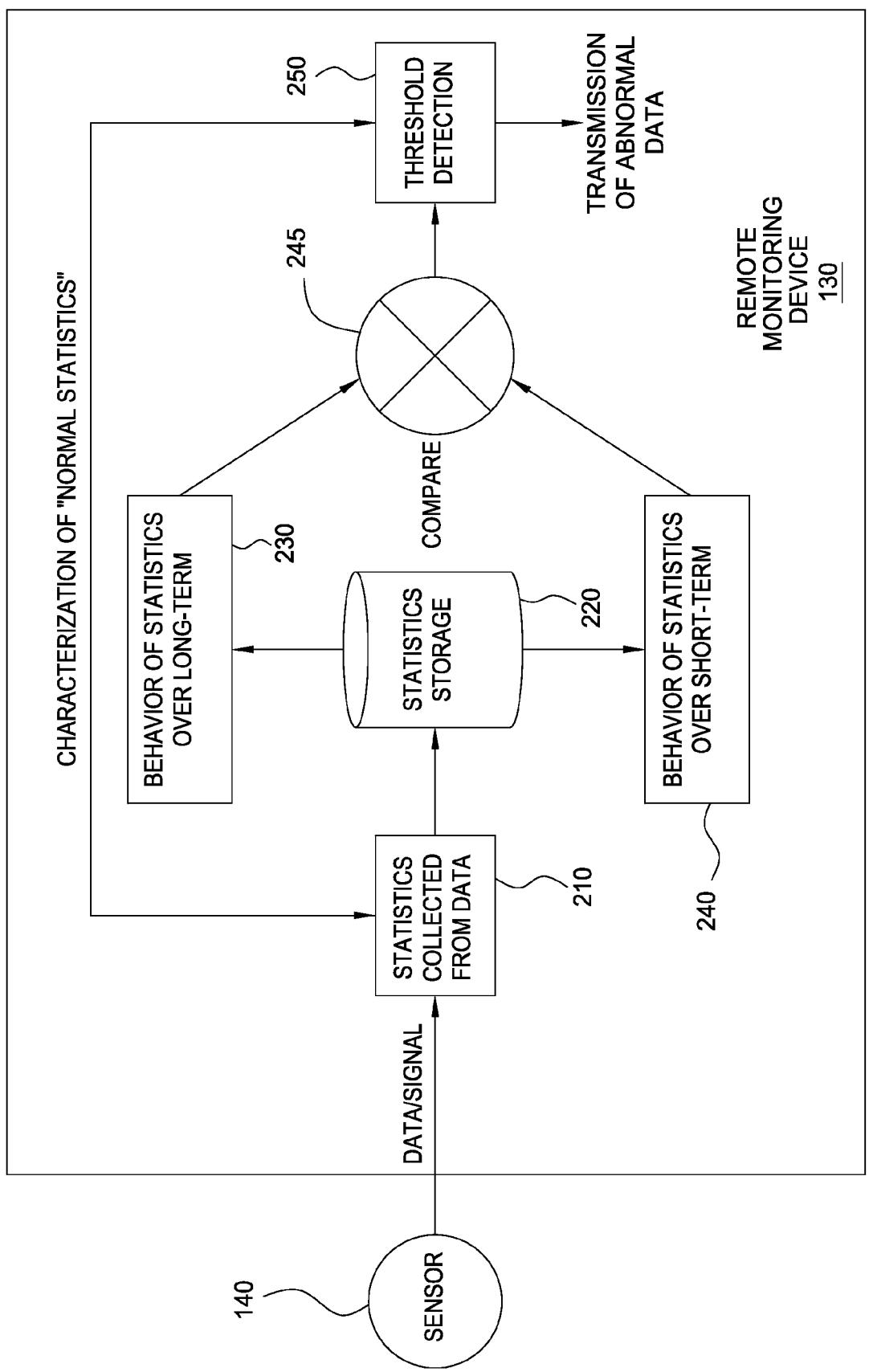
FIG. 2 is a block diagram of an exemplary device used to monitor an environment, according to one embodiment of the invention.

FIG. 2 is a detailed block diagram of an exemplary remote monitoring device 130, according to one embodiment of the invention. As was described with reference to FIG. 1, the remote monitoring device 130 may be connected to a sensor 140 which detects changes in an environmental variable. The sensor 140 may transmit a signal or data into the monitoring device 130. The sensor 140 may transmit an analog signal into the monitoring device, wherein the signal may be converted into a digital representation of the signal. Conversely, the sensor 140 may convert the analog signal into a digital data before transmitting information into the monitoring device. Furthermore, the sensor 140 may provide data or a signal constantly, or may provide the data or the signal only when triggered by external factors.

According to one embodiment of the invention, once the signal or data is received by the monitoring device 130, the data may be analyzed by a microprocessor or other device capable of signal or data analysis. For example, the microprocessor may be a digital signal processor (DSP). As shown in FIG. 2, as data is received, the remote monitoring device 130 may use the data to calculate statistics which model the behavior of the data or signal over time. The statistical calculations may be performed in statistics collection block 210. The statistical calculations may include, but are not limited to, probability density, variance, power spectral density, mean and/or autocorrelation.

Figure 3:
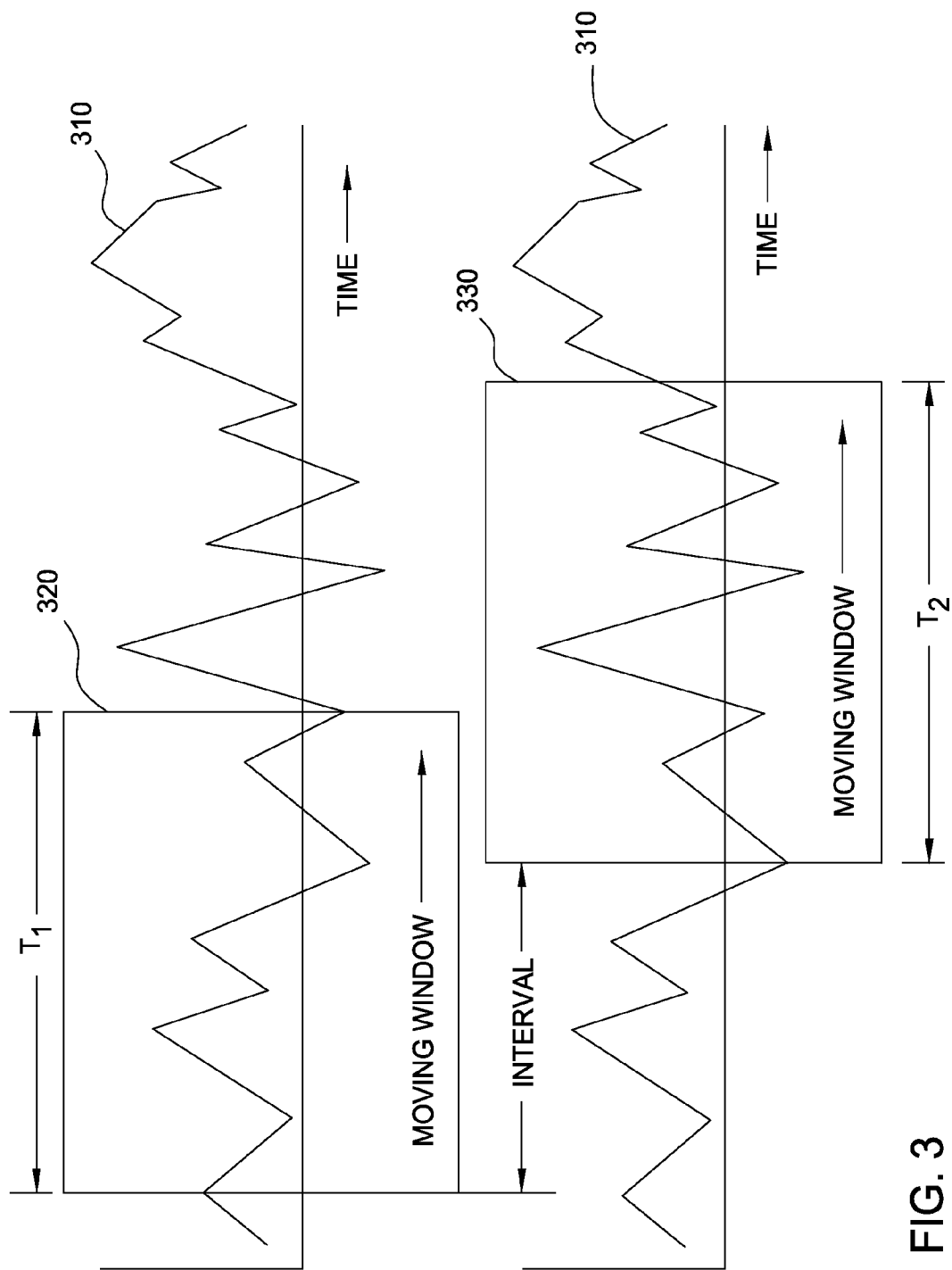
FIG. 3 illustrates an exemplary signal to be sampled by a monitoring device, according to one embodiment of the invention.

FIG. 3 illustrates a signal 310 for which statistics values may be calculated. According to embodiments of the invention, the statistical behavior of the signal 310 is calculated over different periods of time. A period of time for which statistics are to be calculated may be referred to as a window. A first window 320 for statistical calculations is illustrated in FIG. 3. As can be seen the first window 320 defines a period of time $T_1$ over which the signal 310 has some behavior (variations in amplitude and/or phase).

Over time, the results of the statistical calculations may change as the window samples different portions of the signal 310. The sampling of different portions of the signal may be referred to as moving the first window 320. As one portion of the signal 310 enters the range of the first window 320 on one side of the first window 320, another portion of the signal 310 leaves the range of the first window 320 on other end of the first window 320. Therefore, it can be said that the first window 320 moves along the time axis to sample different portions of the signal 310 and calculate new statistical values corresponding to the sampled portion of the signal 310. According to one embodiment of the invention, the statistics collection block 210, may change the amount of time $T_1$ (the range of the first window 320) in order to better model the behavior of the signal 310.

Furthermore, a second window 330 may be used to sample the signal 310 and calculate further statistics values based on the signal 310. The second window 330 has a time period or range $T_2$. According to one embodiment of the invention, the time period $T_2$ of the second window 330 may be equivalent in length as the time period $T_1$ of the first window 320. Furthermore, similar to the first window 320, the second window 330 may sample different portions of the signal 310 over time. Therefore, it can be said that the second window 330, "moves" along the time axis to sample different portions of the signal 310. Results of statistical calculations over the time period $T_2$ may be used in conjunction with the statistical results of the first window 320 in order to perform further statistical calculations. For example, the second statistical window calculations may be necessary for the statistical calculation of the autocorrelation of the signal 310.

As illustrated in FIG. 3, the second window 330 may sample the signal 310 at a later time than the first window 320. The difference in time between the beginning of the first window's 320 sampling time and the beginning of the second window's 330 sampling time may be referred to as an interval. According to one embodiment of the invention, the statistics collection block 210 may vary the interval length in order to better model the behavior of the signal.

FIG. 4 illustrates exemplary statistical algorithms which may be used in the statistics collection block 210 to model behavior of the signal 310. For example, a series of measurements within the windows (320 and 330) and reported by the sensor 140 may be used in conjunction with the mean algorithm to calculate the mean of the environmental variable. Furthermore, through the use of windows and the statistical algorithms illustrated in FIG. 4, the statistics collection block 210 may calculate the variance of the signal 310 or the variance of the autocorrelation of the signal 310.

The monitoring device 130 may also contain storage 220. Storage may be any type of storage known to those skilled in the art. For example, storage may be a Direct Access Storage Device (DASD). Although shown as a single device storage 220 may be a combination of devices such as fixed disc drives, memory cards or optical storage. Furthermore, storage 220 may be a random access memory (RAM) or a combination of DASD and RAM. Storage 220 may be coupled to the statistics collection block 210 and used to record the statistical model of the signal 310 generated in statistics collection block 210.

According to one embodiment of the invention, after the statistical calculations modeling the data received from the sensor have been stored, long-term behavior of the statistics may be calculated at block 230. Long-term statistics may be a calculation which models the statistical behavior of the signal over a pre-defined or dynamic period of a past number of the statistical calculations stored in statistics storage 220. The period of time may be considered long-term with respect to calculations over a short-term (discussed further below). For example, the long-term calculation may be over a period of the past one-hundred (100) samples of the statistical values stored in storage block 220. According to one embodiment of the invention, the long-term behavior of the statistics may be an average of a number of the past statistical values and/or may be a variance of a number of the past statistical values.

Also illustrated in FIG. 2, after the statistical calculations modeling the data received from the sensor have been stored, short-term behavior of the statistics may be calculated at block 240. Similar to the long-term statistics, the short-term statistics may be a calculation which models the statistical behavior of the signal over a pre-defined or dynamic period of a past number of the statistical calculations stored in storage block 220. In contrast to the long-term statistics, the period of time for the short-term statistics may be considered short with respect to the long-term calculations. For example, the short-term calculation may be over a period of the past ten (10) samples of the statistical values stored in storage block 220.

After the long-term behavior of the statistics and the short-term behavior of the statistics have been calculated in blocks 230 and 240 respectively, they may then be compared in a compare block 245. According to one embodiment of the invention, the compare block 245 calculates a difference between the long-term behavior of the statistics and the short-term behavior of the statistics.

Figure 5:
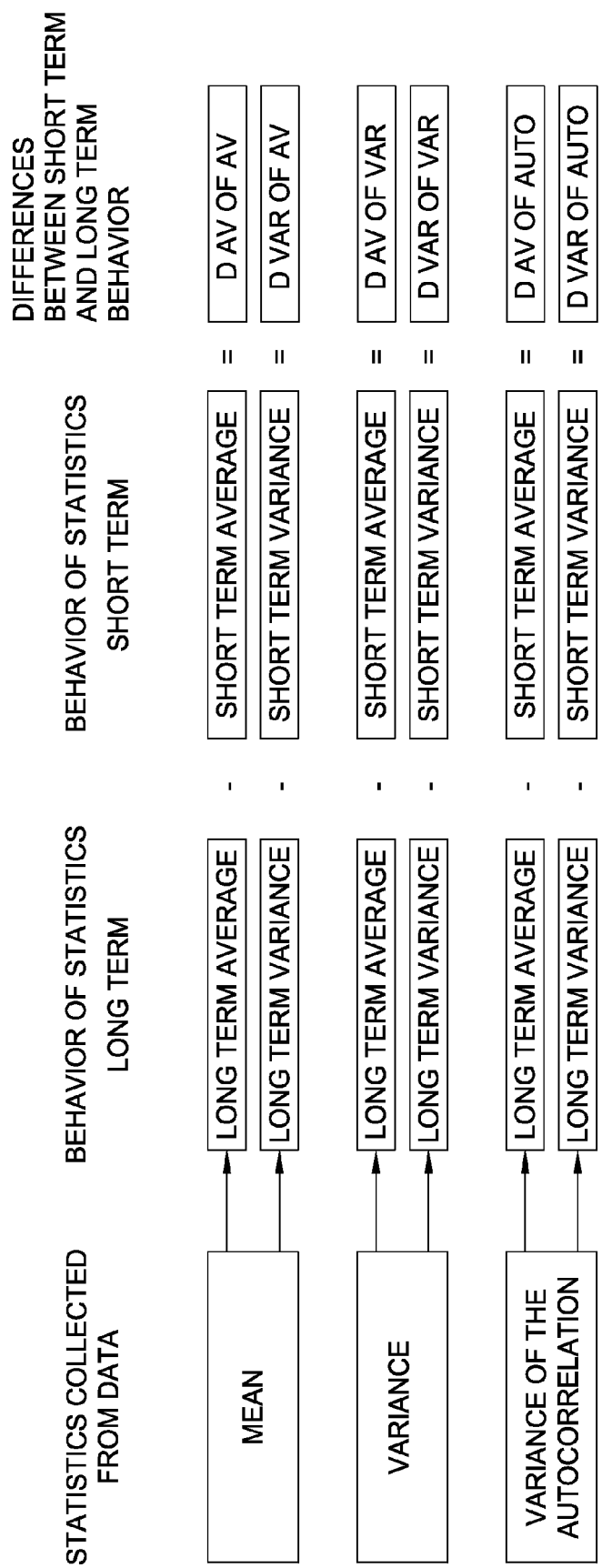
FIG. 5 is a table of statistical algorithms, according to one embodiment of the invention.

FIG. 5 illustrates some of the possible comparisons that may take place in the compare block 245. For example, a mean of the signal 310 may have been calculated in statistical calculations block 210. Later, a long-term average of the mean value may have been calculated in block 230 and a short-term average of the mean value may have been calculated in block 240. In the compare block 245 the difference of the long-term average of the mean and the short-term average of the mean may be calculated. Similarly, a variance of the signal 310 may have been calculated in block 210. Later, a long-term average of the variance value may have been calculated in block 230 and a short-term average of the variance may have been calculated in block 240. In the compare block 245 the difference of the long-term average of the variance and the short-term average of the variance may be calculated. As illustrated in FIG. 5, several other differences may be calculated in the compare block 245 of the remote monitoring device 130.

After the comparison of the long-term behavior of the statistics and the short-term behavior of the statistics has been calculated, the results are sent to threshold detection block 250. Within the threshold detection block 250, the monitoring device 130 may determine if the absolute value of the difference between the long-term behavior of the statistics and the short-term behavior of the statistics exceeds a threshold value. The threshold value used in the threshold detection block 250 may be predefined or may be calculated dynamically. For example, the threshold value may be set at the base unit and transferred to the monitoring device when the monitoring device 130 is powered up.

Alternatively, the threshold value may be dynamically set or changed within the remote monitoring device 130. For example, the remote monitoring device 130 may calculate the threshold value based on the statistical model of the signal calculated in the statistics calculation block 210. The statistics calculation block 210 may dynamically determine a characterization of "normal" behavior based on the statistical calculations. According to one embodiment of the invention, this characterization of "normal" behavior may then be used to determine a threshold value. For example, the statistics calculation block 210 may calculate a normal or average of high-values of one of the statistics (e.g., mean, variance, autocorrelation, etc.). The high-value of the statistic may be set to be the threshold value.

According to one embodiment of the invention, if the threshold detection block 250 determines that the absolute value of the difference between the long-term statistics and the short-term statistics exceeds the threshold value, an action may be taken by the remote monitoring device 130. For example, in response to the threshold being exceeded data may be transmitted by the remote monitoring device 130, an alert may be generated by the remote monitoring device 130, or both. The data transmitted may be a signal to the base unit 110 of abnormal behavior. Data transmission may include a sample of the signal which caused the threshold to be exceeded and consequently triggered the transmission of data. According to another embodiment of the invention, an alert may be an audible or visual indicator to an individual in close proximity to the remote monitoring device 130. Thus, individuals responsible for monitoring the environment (e.g., individuals located at the base unit or at the remote monitoring device) may be informed of abnormal behavior. Furthermore, taking action (i.e., transmitting data or generating an alert) only when abnormal statistical behavior of the signal is detected may result in the reduction of power consumption by the remote monitoring device 130 due to unnecessary data transmission.

The threshold value may be set low enough such that a difference in the long-term and short-term behavior of the statistics due to an anomaly will exceed the threshold causing the monitoring device to transmit data. However, the threshold value may be set to a value high enough such that differences in the long-term and short-term behavior of the statistics during periods of time when anomalies are not present will not exceed the threshold. By setting the threshold high enough to prevent differences from exceeding the threshold when there is not an anomaly occurring, the monitoring device will only transmit data when anomalies occur (i.e., no false-positive reports). Thus, power in a remote monitoring device may be conserved in a monitoring device by only transmitting data when anomalies occur.

If at the threshold detection block 250 the difference between the long-term statistics and the short-term statistics does not exceed the threshold value, the monitoring device 130 may continue to monitor the environmental variables without alerting the base unit 110, according to one embodiment of the invention. If the threshold value is not exceeded, according to embodiments of the invention, the remote monitoring device 130 may be configured to periodically transmit data (e.g., portions of the stored signal or statistics relating to the stored signal) to the base unit 110 at regular intervals. This periodic transmission of data may serve as an indicator to the base unit 110 that the remote monitoring device 130 is still functioning.

Exemplary Signals

Figure 6A:
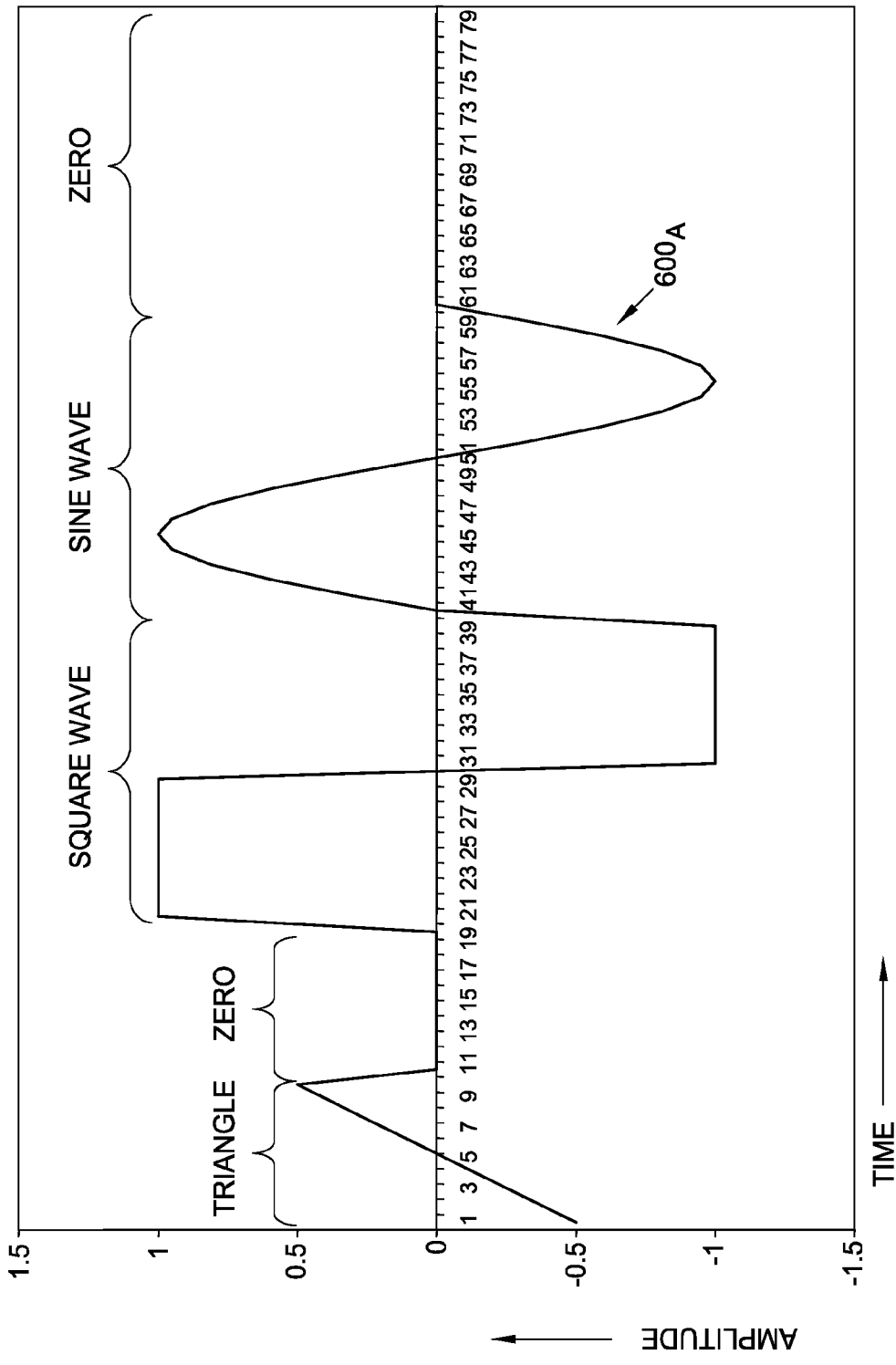

FIG. 6A illustrates an exemplary waveform or signal $600_A$ which may be sent to the remote monitoring device 130 by the sensor 140. The signal $600_A$ is an example of normal changes of a monitored environmental variable over time. Therefore, the signal $600_A$ will be referred to as the normal signal $600_A$. As can be seen in FIG. 6A, the signal $600_A$ varies in amplitude and phase along the time axis.

An initial portion of the normal signal $600_A$ has a triangular shape for approximately ten samples along the time axis. Following the triangular shaped section the normal signal $600_A$ has a zero amplitude portion for another ten samples along the time axis. Following the zero amplitude portion of the normal signal $600_A$, the normal signal $600_A$ has a square wave shape for approximately twenty samples along the time axis. Following the square wave the normal signal $600_A$ has a sine wave shape for approximately twenty samples along the time axis. After the sine wave shape of the normal signal $600_A$, the normal signal $600_A$ again has a zero amplitude for approximately twenty samples along the time axis. As will be seen, variations of the normal signal $600_A$ will represent exemplary anomalies in a monitored environmental variable.

For example, FIG. 6B illustrates a second signal $600_B$ which contains a change from the behavior of the normal signal $600_A$. The signal $600_B$ is exactly the same as the original signal $600_A$ with the exception of one change. That is, signal $600_B$ does not contain the sine wave portion that the normal signal $600_A$ contained. The signal $600_B$ with the missing sine wave portion shall be referred to herein as the first anomaly.

FIG. 6C illustrates third signal $600_C$ which also contains an anomaly in comparison to the normal signal $600_A$. The third signal $600_C$ is exactly the same as the normal signal except the triangular portion of the third signal $600_C$ has been tripled in amplitude in comparison to the triangular portion of the normal signal $600_A$. The third signal $600_C$, containing the larger triangular portion, shall be referred to herein as the second anomaly.

FIG. 6D illustrates a fourth signal $600_D$. The fourth signal $600_D$ also contains an anomaly in comparison to the normal signal $600_A$. The fourth signal $600_D$ contains two entire periods of the normal signal $600_A$, and the fourth signal $600_D$ does not contain a zero amplitude portion after the sine wave portion. The fourth signal $600_D$ may be referred to as the third anomaly.

FIG. 6E illustrates a fifth signal $600_E$, which also contains an anomaly. The fifth signal $600_E$ is the same as the normal signal $600_A$; however, the length of the square wave portion of the fifth signal $600_E$ is twice as long. The doubling of the length of the square wave portion changes the overall length or period of the fifth signal $600_E$ in comparison to the original signal $600_A$. The fifth signal $600_E$ shall be referred to herein as the fourth anomaly.

The signals described above may be appended to each other to form an exemplary signal with portions of normal behavior and portions including the anomalies. The signals may be appended to each other in the order described above with reference to FIG. 6 and fed into the monitoring device 130. This may simulate changes in an environmental variable monitored by a sensor 140. Initially, the original signal may be repeated some number of times so that the monitoring device may calculate and store long-term statistics. After the initial period of the repeated normal signal, the anomaly signals may be fed into the monitoring device 130 to simulate changes in the monitored environmental variable.

Figure 7:
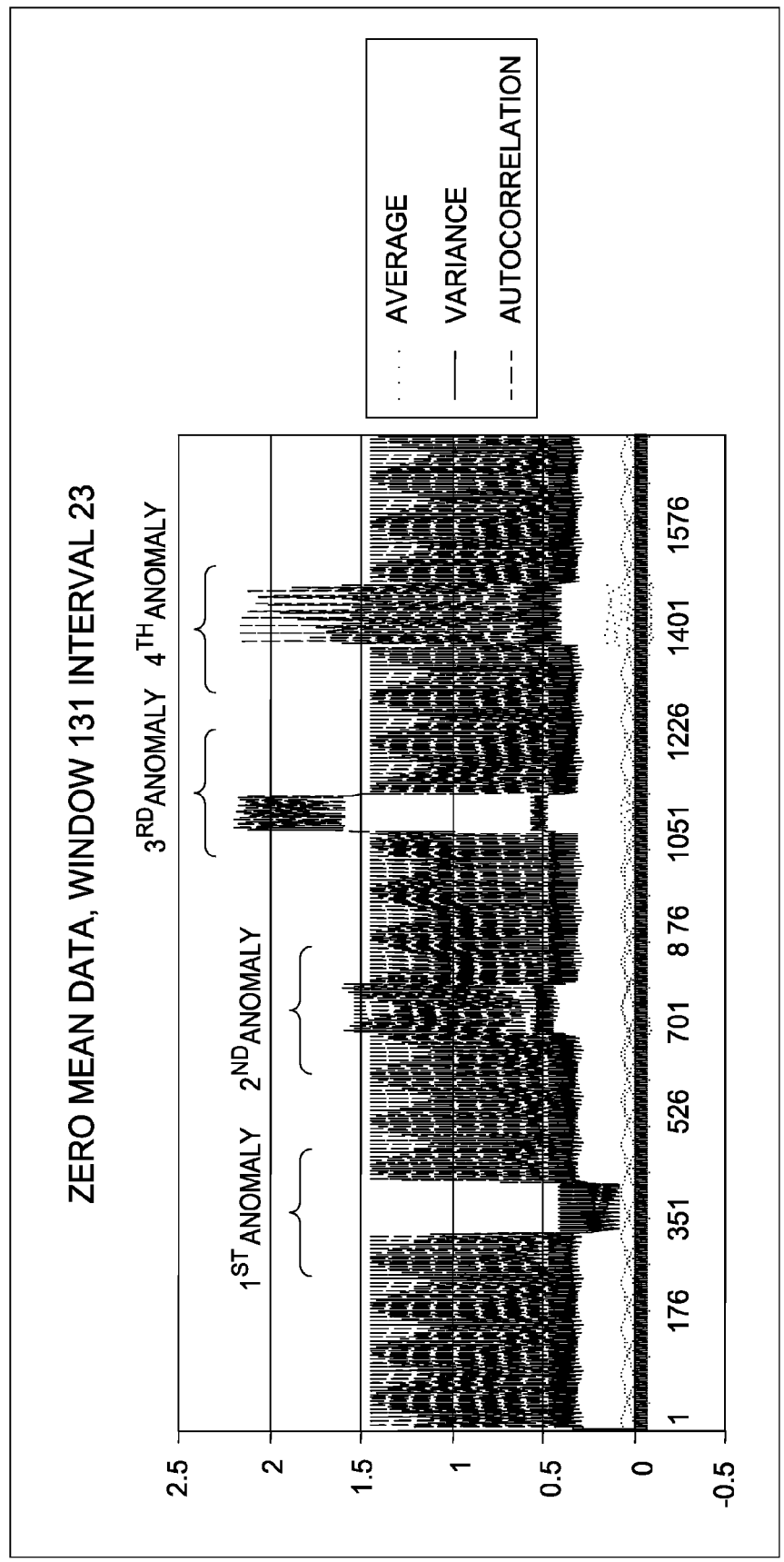
FIGS. 7 and 9 illustrate long-term statistics calculated from a sampled exemplary signal, according to one embodiment of the invention.

As previously described, as the exemplary signal with anomalies is fed into the monitoring device, long-term statistics may be calculated in the long-term statistics block 210 of the monitoring device 130. FIG. 7 is a graph of long-term statistics calculated for the exemplary signal with anomalies. As can be seen in FIG. 7 the long-term average, long-term variance, and the long-term autocorrelation were calculated for the exemplary signal with anomalies. As mentioned above with regards to FIG. 3, the long-term statistical calculations may be performed over a certain window length and with a certain window interval. The window length and interval may affect the detection of anomalies within the signal.

In the present example, each of the long-term statistical calculations was calculated using a window length of 131 samples and a window interval of 23 samples.

As illustrated in FIG. 7, at a point in time labeled $1^{st}$ Anomaly, the long-term variance of the autocorrelation statistics and the long-term variance demonstrate a change in the pattern of their plotted values. This change in pattern of the statistics is caused by the introduction of the first anomaly in the exemplary signal with anomalies. It should be noted that this change is not reflected in the long-term average.

After the first anomaly, at a point in time labeled $2^{nd}$ Anomaly, the long-term variance of the autocorrelation and the long-term variance again demonstrate a change in the pattern of their plotted values. This change in pattern of the statistics is caused by the introduction of the second anomaly in the exemplary signal with anomalies. Again, the long-term average demonstrates no change due to the second anomaly.

At a later point in time, labeled the $3^{rd}$ Anomaly in FIG. 7, the long-term average, variance and variance of the autocorrelation demonstrate a change in the pattern of their plotted values. This change in pattern is due to the introduction of the third anomaly in the exemplary signal with anomalies.

Later, at a point in time labeled $4^{th}$ Anomaly, the long-term average, variance and variance of the autocorrelation of the signal demonstrate a change in their plotted values due to the introduction of the fourth anomaly into the exemplary signal with anomalies.

As can be seen in FIG. 7 each of the long-term statistics contains a significant amount of noise, furthermore each of the long-term statistics demonstrates a cyclical behavior.

As described above with reference to FIG. 2, after the statistics of the signal have been calculated and stored, long-term and short-term behavior of the statistics may be calculated. The long-term and short-term behavior of the statistics may be calculated by performing statistical calculations on the long-term statistical data calculated using the window technique described above with reference to FIG. 3. The long-term behavior of the statistics may be calculated for a first number of samples of the long-term statistical data. The short-term behavior of the statistics may also be calculated, however, for a second number of samples of the long-term statistical data. For example, the long-term behavior of the statistics may be calculated for a sample of statistics of size 100 and the short-term behavior of the statistics may be calculated for a sample of the statistics of size 10.

After each of the long-term behavior of the statistics and short-term behavior of the statistics are calculated, they may be compared with one another in the compare block 245, as described above with reference to FIG. 2. For example, the difference between the long-term statistics and the short-term statistics may be calculated in the compare block 240.

Figure 8:
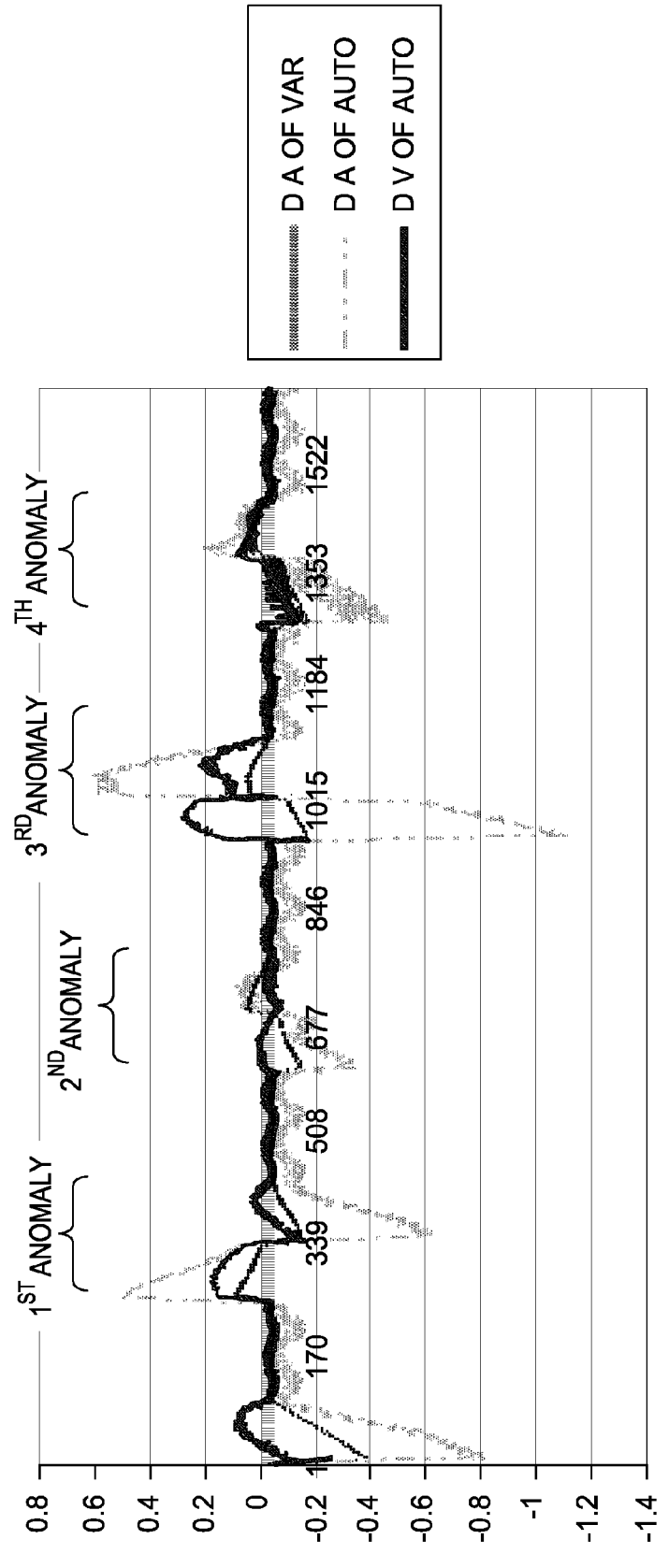

FIG. 8 illustrates a graph of the differences between the long-term behavior of the statistics and short-term behavior of the statistics for sample sizes of 100 and 10 respectively. The graph in FIG. 8 illustrates three differences between the long-term behavior and the short-term behavior: the difference of the long-term average of the variance of the statistics and the short term average of the variance of the statistics; the difference of the long-term average of the variance of the autocorrelation of the statistics and the short-term average of the variance of the autocorrelation of the statistics; and the difference of the long-term variance of the variance of the autocorrelation of the statistics and the short-term variance of the variance of the autocorrelation of the statistics. Although more statistical differences may have been calculated in the compare block 245, for purposes of clarity only three differences are shown on the graph in FIG. 8.

The varied amplitude of the three plotted differences illustrates larger and smaller differences between the long-term and short-term statistics. As is apparent in the graph of FIG. 8, five distinct periods of larger differences between the long-term behavior of the statistics and short-term behavior of the statistics exist. These periods of larger differences are illustrated by spikes (i.e., relatively short periods of higher amplitude) in the lines plotted which represent the differences. Four of the spikes correspond to the anomalies introduced to the monitoring device at different times. The initial spike, however, corresponds to a difference created by the remote monitoring device 130 obtaining an initial normal operating behavior.

As is also apparent from the graph of FIG. 8, the difference of the average of the variance of the autocorrelation results in the largest difference when anomalies are encountered. As illustrated, around the point in time when the first anomaly occurs, the difference of the average of the variance of the autocorrelation is as low as −0.6. With respect to the second anomaly the difference is as low as −0.3, with respect to the third anomaly as low as −1.0, and with respect to the fourth anomaly as low as −0.4. Meanwhile, during the periods between anomalies, when there is no anomaly occurring in the signal, the difference of the average of the variance of the autocorrelation is between 0.2 and −0.2. Therefore, the difference of the average of the variance of the autocorrelation is relatively small during times when an anomaly is not present in the signal, however the difference of the average of the variance of the autocorrelation is relatively large during times when an anomaly is present in the signal. Therefore, the comparison (difference) of the long-term behavior of the statistics with the short-term behavior of the statistics is an adequate and distinct indicator of an anomaly occurring within a monitored environment (signal).

As described with reference to FIG. 2, the threshold value may be set low enough such that a difference in the long-term and short-term statistics due to an anomaly will exceed the threshold causing the monitoring device to transmit data. Furthermore, the threshold value may be set to a value high enough such that differences in the long-term and short-term statistics caused by factors other than anomalies will not exceed the threshold. With respect to the difference of the average of the variance of the autocorrelation between the long-term and short-term statistics illustrated in FIG. 8, a threshold value of 0.3 would satisfy both criteria.

A threshold value of 0.3 compared to the absolute value of the difference of the average of the variance of the autocorrelation would ensure that each of the anomalies would trigger the monitoring device to transmit data. This is due to the fact that the difference of the average of the variance of the autocorrelation during each period of an anomaly exceeds 0.3. Furthermore, a threshold value of 0.3 would ensure that differences in the average of the variance of the autocorrelation during periods of time not containing anomalies would not trigger the monitoring device to transmit data. Therefore, the difference between long-term behavior of the statistics and short term behavior of the statistics may be used to determine when data should be transmitted or an alert should be generated from a remote monitoring device 130. Thus, power in the remote monitoring device 130 may be conserved by only transmitting when the absolute value of the difference between the long-term and short-term statistics exceeds some predefined or dynamic threshold.

Figure 9:
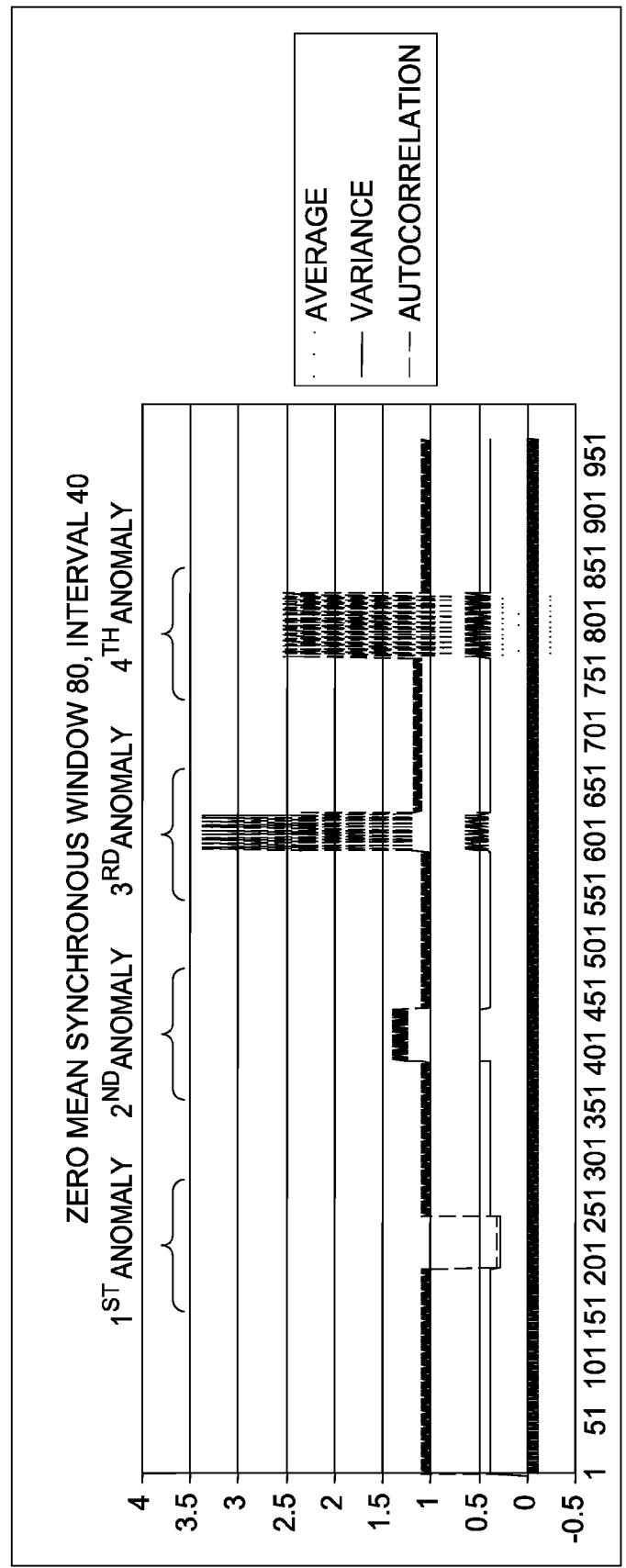

FIG. 9 is also a graph of long-term statistics of the exemplary signal containing anomalies graph of FIG. 7. However, the window length and interval used to calculate the statistics of the signal for FIG. 9 are different than those used for FIG. 7. Specifically, the size of the window (80 samples) used to calculate the statistics in FIG. 9 is equal in size or synchronous to the period of the normal signal 600$_A$ (80 samples).

Using a sampling window that is synchronous or equal in size to the period of the normal signal 600$_A$ creates less variation (i.e., static or noise) in the statistics which model the signal. For example, the variance and the variance of the autocorrelation statistics calculated and plotted in FIG. 9 (the average, the variance and the variance of the autocorrelation) demonstrate small variations in amplitude during periods when the sample signal does not have anomalies, yet they demonstrate variations in amplitude during periods when anomalies are present in the signal. In contrast, the statistics calculated for FIG. 7 use a window length of 131 which is not synchronous to the normal signal 600$_A$. The statistics calculated and illustrated in FIG. 7 have large variations (static or noise) throughout the overall sampling period.

FIG. 10, illustrates the differences in the long-term behavior of the statistics and the short-term behavior of the statistics. FIG. 10 illustrates the differences in the behavior of the statistics when the initial statistics calculations which model the data were calculated with a window size of 80 and a window interval of 40. Specifically, FIG. 10 illustrates the difference between the average of the variance of the long-term behavior of the statistics and the average of the variance of the short-term behavior of the statistics; the difference of the average of the variance of the autocorrelation; and the difference of the variance of the variance of the autocorrelation.

The differences between the long-term behavior of the statistics and the short-term behavior of the statistics plotted in FIG. 10 were calculated using the past 200 samples of the statistical calculations while the short-term behavior of the statistics were calculated with the past 20 samples of the statistical calculations. As illustrated, as the first anomaly occurs in the sample signal all three differences demonstrate a larger than zero difference. Furthermore, all three signals illustrate a larger than zero difference with respect to the second anomaly. However, the differences of the first anomaly and the second anomaly "blend" into one another. This may cause unwanted data-transmission due to the threshold being exceeded for an extended period of time.

All three differences demonstrate a larger period of difference when the third anomaly occurs and when the fourth anomaly occurs. However, for a period of time between the third and the fourth anomaly, and for a period of time after the fourth anomaly, the difference of the average of the variance and the difference of the average of the variance of the autocorrelation are relatively large. This increased difference may also cause a threshold value to be exceeded, and consequently a false-positive transmission of data or generation of an alert by the remote monitoring device 130.

However, if one were to choose a threshold value of 0.4 for the absolute value of the difference of the average of the variance of the autocorrelation, then the difference would trigger transmission for each anomaly. However, the monitoring device would transmit data during the period not containing anomalies between the first and second anomalies.

As can be seen from FIGS. 8 and 10, the difference between the long-term average of the variance of the autocorrelation and the short term average of the variance of the autocorrelation may result in the best detection of anomalies. However, other statistical calculations are also sufficient for purposes of anomaly detection. Furthermore, as illustrated in FIG. 9, a statistical calculation window relatively synchronous to the period of the environmental variable behavior may provide statistics with less noise. Also, increasing the length of the sample periods for both the long-term behavior of the statistics and the short-term behavior of the statistics, as illustrated in FIG. 10, may increase the difference between the long-term and short-term behavior of the statistics during periods when an anomaly occurs; however, the increased periods may also result in larger differences during periods when anomalies are not present, thereby increasing the probability of false-positive data transmission or alert generation.

An exemplary algorithm (in interpreted BASIC) for calculating the mean, variance, and variance of the autocorrelation of a set of data, according to one embodiment of the invention is as follows:

```
100 rem ****************************************
110 rem **** Compute running average and variance ****
115 rem **** Modified 18 May 2006 to include autocorrelation ****
116 rem **** Modified 22 May 2006 to include variable file names*
120 rem **** Input file default is waveform.csv ****
121 rem **** Output file is out[run#].csv ****
```

```
130 rem ********************************************
131 print "What is input filename? (Press enter for wave-
form.csv)";
132 input n$
133 if n$=" " then n$="waveform.csv"
140 open n$ for input as #1
141 print "Designate unique run number."
142 print "Please note this software will happily overwrite
an older file.";
143 input r$
150 open "out"+r$+".csv" for output as #2
160 print "Computes average, variance and scaled autocor-
relation."
170 input "Input number of samples to use: n";n
180 input "Input how often to compute: m<n";m
185 print "Now computing."
190 print #2, "number of samples=";n
200 print #2, "how often computed=";m
202 counter=0
210 dim x(n)
220 rem *****preload vector with n samples**********
230 for k=1 to n
240 input #1, x(n)
250 next k
260 rem *****now start the major loop**********
270 for i=1 to 40000-m-n step m
280 sumav=0:sumvar=0
290 for j=1 to n
300 sumav=sumav+x(j)
310 sumvar=sumvar+x(j)*x(j)
320 next j
330 av=sumav/n
340 var=sumvar/(n-1)
344 counter=counter+1
346 print #2, counter;",";
350 print #2, using "###.#####"; av;
360 print #2,",";
370 print #2, using "###.#####"; var;
380 rem *****now start the calculation of the variance of
theautocorrelation*********
390 rem *****built on autocor7.bas ***********
395 rem *****after Schwartz/Shaw,p 151**********
400 bigsum=0
410 for k=0 to n-1
420 sum=0
430 for j=0 to n-k-1
440 sum=sum+x(j+1)*x(j+k+1)
450 next j
460 sum=sum/n
470 bigsum=bigsum+sum*sum
480 next k
490 bigsum=bigsum/(n-1)
495 print #2, ",";
500 print #2, using "###.#####"; 100
510 rem *****now need to get m more samples, so discard
first m and move therest down******
520 for j=1 to n-m
530 x(j)=x(j+m)
540 next j
550 rem *****now get the m samples and put them at
end******
560 for j=1 to m
570 input #1,x(j+n-m)
580 next j
590 rem *****ready to close the major loop******
600 next i
610 rem *****and we're done*******
620 close #1
630 close #2
635 beep
640 end
```

An exemplary algorithm (in interpreted BASIC) for calculating the long-term behavior of a set of statistics and the short-term behavior of the set of statistics, according to one embodiment of the invention is as follows:

```
100 rem ********************************************
110 rem ****Takes output of outx.csv and computes run-
ning short-term and long****
120 rem ****averages and variances for the three columns
of numbers ****
130 rem ****
140 rem ********************************************
150 rem
160 rem start out with test to count the number of lines in a
file—goes in p
170 on error goto 350
180 p=0
190 print "What is input filename with extension?";
200 input n$
210 print "What is output filename with extension?";
220 input o$
```

230 print "What is the length of the long-term statistics window?";

240 input n 250 print "What is the length of the short-term statistics window?";

260 input m 270 dim x(n), y(n), z(n)

280 open n$ for input as #1

285 open o$ for output as #2

290 line input #1,a$: rem this drops first (text) line 300 line input #1,a$: rem this drops second (text) line 310 line input #1,a$: p=p+1

320 goto 310

330 rem 340 rem 350 print "we've counted the number of lines in the file"

360 resume 370

370 print "number of lines in the file is:";p 380 close #1

390 rem 400 open n$ for input as #1

420 rem *transfer run information to new file 430 line input #1, a$: print #2, a$ 440 line input #1, a$: print #2, a$ 450 rem * add new information to new file ***

460 print #2, "Long-term statistics window is ";n;" samples."

470 print #2, "Short-term statistics window is ";m;" samples."

480 print #2, "LT AV X";",";"ST AV X";",";"D AV of AV";",";"LT VAR X";",";"ST VARX";",";"D VAR of AV"; ",";"LT AV Y";",";"ST AV Y";",";"D A of VAR";",";"LT VAR Y";"";

485 print #2, "ST VAR Y";",";"D V of V";",";"LT AV Z";",";"ST AV Z";",";"D A of Auto";",";"LT VAR Z";","; "ST VAR Z";",";"D V of Auto"

490 rem preload vectors with samples ****

500 rem w is a dummy variable to get us past the counter in the OUTx files 8***

510 for k=1 ton 520 input #1, w, x(n), y(n), z(n)

530 next k 540 rem 550 rem ** now start the major loop **

560 for i=1 to p−n 570 rem 580 rem * compute the long term averages and variances *

590 Itsumavx=0

600 Itsumvax=0

610 Itsumavy=0

620 Itsumvay=0

630 Itsumavz=0

640 Itsumvaz=0

650 for j=1 to n rem *** computes over long-term window

660 Itsumavx=Itsumavx+x(j)

670 Itsumavy=Itsumavy+y(j)

680 Itsumavz=Itsumavz+z(j)

690 next j

700 Itsumavx=Itsumavx/n

710 Itsumavy=Itsumavy/n

720 Itsumavz=Itsumavz/n 730 for j=1 to n

740 Itsumvax=Itsumvax+(x(j)−Itsumavx)^2

750 Itsumvay=Itsumvay+(y(j)−Itsumavy)^2

760 Itsumvaz=Itsumvaz+(z(j)−Itsumavz)^2

770 next j

780 Itsumvax=Itsumvax/(n−1)

790 Itsumvay=Itsumvay/(n−1)

800 Itsumvaz=Itsumvaz/(n−1)

810 rem 820 rem * compute short term averages and variances *

830 rem 840 stsumavx=0

850 stsumvax=0

860 stsumavy=0

870 stsumvay=0

880 stsumavz=0

890 stsumvaz=0

900 for j=n−m to n :rem *** computes over short-term window 910 stsumavx=stsumavx+x(j)

920 stsumavy=stsumavy+y(j)

930 stsumavz=stsumavz+z(j)

940 next j 950 stsumavx=stsumavx/m 960 stsumavy=stsumavy/m 970 stsumavz=stsumavz/m 980 for j=n−m to n 990 stsumvax=stsumvax+(x(j)−stsumavx)^2

1000 stsumvay=stsumvay+(y(j)−stsumavy)^2

1010 stsumvaz=stsumvaz+(z(j)−stsumavz)^2

1020 next j 1030 stsumvax=stsumvax/(m−1)

1040 stsumvay=stsumvay/(m−1)

1050 stsumvaz=stsumvaz/(m−1)

1060 rem 1070 rem *** print these out to output file 1080 rem 1090 print #2, using "###.#####"; Itsumavx;

1100 print #2, ",";

1110 print #2, using "###.#####"; stsumavx;

1120 print #2, ",";

1130 print #2, using "###.#####"; Itsumavx−stsumavx;

1140 print #2, ",";

1150 print #2, using "###.#####"; Itsumvax;

1160 print #2, ",";

1170 print #2, using "###.#####"; stsumvax;

1180 print #2, ",";

1190 print #2, using "###.#####"; Itsumvax−stsumvax;

1200 print #2, ",";

1210 print #2, using "###.#####"; Itsumavy;

1220 print #2, ",";

1230 print #2, using "###.#####"; stsumavy;

1240 print #2, ",";

1250 print #2, using "###.#####"; Itsumavy−stsumavy;

1260 print #2, ",";

1270 print #2, using "###.#####"; Itsumvay;

1280 print #2, ",";

1290 print #2, using "###.#####"; stsumvay;

1300 print #2, ",";

1310 print #2, using "###.#####"; Itsumvay−stsumvay;

1320 print #2, ",";

1330 print #2, using "###.#####"; Itsumavz;

1340 print #2, ",";

1350 print #2, using "###.#####"; stsumavz;

1360 print #2, ",";

1370 print #2, using "###.#####"; Itsumavz−stsumavz;

1380 print #2, ",";

1390 print #2, using "###.#####"; Itsumvaz;

1400 print #2, ",";

1410 print #2, using "###.#####"; stsumvaz;

1420 print #2, ",";

1430 print #2, using "###.#####"; Itsumvaz−stsumvaz 1440 rem 1450 rem ** now we need to get the next sample. Get one more and moveeverything down*

1460 rem 1470 for j=1 to n−1

1480 x(j)=x(j+1): y(j)=y(j+1): z(j)=z(j+1)

1490 next j 1500 rem 1510 input #1, w,x(n),y(n),z(n)

1520 rem 1530 rem * now resume major loop 1540 next i 1550 rem 1560 rem * should be ready to close 1570 rem 1580 close #1

1590 close #2

1600 end

CONCLUSION

The statistics of a monitored environmental variable may be calculated and stored. Based on the stored statistics, a threshold value may be determined based on the calculated statistics. Furthermore, a long-term behavior of the statistics and a short-term behavior of the statistics may be calculated. A difference between the long-term behavior of the statistics and the short-term behavior of the statistics may be compared to the threshold value. A difference which exceeds the threshold value may indicate an anomaly occurred within the monitored environment. In response to the detected anomaly, an alert may be generated and/or a signal may be transmitted.

While the foregoing is directed to embodiments of the present invention, other and further embodiments of the invention may be devised without departing from the basic scope thereof, and the scope thereof is determined by the claims that follow.

What is claimed is:

1. A computer-implemented method of detecting an anomaly in a signal, comprising:

calculating a first plurality of values based on a set of statistics which model the signal, wherein the first plurality of values is calculated over a first period of time;

calculating a second plurality of values based on the set of statistics which model the signal, wherein the second plurality of values is calculated over a second period of time;

calculating a third plurality of values, wherein the third plurality of values is calculated using the first plurality of values and the second plurality of values, and wherein the third plurality of values is calculated based on at least an autocorrelation of the signal;

calculating a difference between at least one of the third plurality of values and a corresponding long-term value, wherein the long-term value is calculated over a third period of time, and wherein the third period of time is greater than the first and second periods of time;

comparing the difference to a threshold wherein the difference exceeding the threshold is indicative of the anomaly in the signal;

if the difference exceeds the threshold, performing an action wherein performing the action requires a relative increase in power consumption; and transmitting an alert signal or a portion of the signal indicating when the difference exceeds the threshold.

2. The computer-implemented method of claim 1, wherein the second period of time can begin later or differ in duration as compared to the first period of time.

3. The computer-implemented method of claim 1, further comprising, calculating the threshold based on the set of statistics which model the signal.

4. The computer-implemented method of claim 1, wherein the action comprises sending an alert to a base unit or at least a portion of the signal to the base unit.

5. The computer-implemented method of claim 4, wherein the portion of the signal sent to the remote device contains the anomaly.

6. The computer-implemented method of claim 1, wherein the threshold is predefined.

7. The computer-implemented method of claim 1, further comprising calculating the set of statistics which models by calculating at least one of a mean of the signal, a variance of the signal, or a variance of the autocorrelation of the signal.

8. The computer-implemented method of claim 7, wherein:
   calculating the first plurality of values comprises calculating at least one of an average of the mean of the signal over the first period of time, an average of the variance of the signal over the first period of time, a variance of the mean of the signal over the first period of time, and a variance of the variance of the signal over the first period of time;
   calculating the second plurality of values comprises calculating at least one of an average of the mean of the signal over the second period of time, an average of the variance of the signal over the second period of time, a variance of the mean of the signal over the second period of time, and a variance of the variance of the signal over the second period of time; and
   calculating the third plurality of values comprises calculating at least one of an average of the variance of the autocorrelation of the signal over the first and second periods of time or a variance of the variance of the autocorrelation of the signal over the first and second periods of time.

9. A computer readable storage medium containing a program for detecting an anomaly in a signal which, when executed, performs an operation, comprising:
   calculating a first plurality of values based on a set of statistics which model the signal, wherein the first plurality of values is calculated over a first period of time;
   calculating a second plurality of values based on the set of statistics which model the signal, wherein the second plurality of values is calculated over a second period of time;
   calculating a third plurality of values, wherein the third plurality of values is calculated using the first set of values and the second set of values and wherein the third plurality of values is calculated based on at least an autocorrelation of the signal;
   calculating a difference between at least one of the third plurality of values and a corresponding long-term value, wherein the long-term value is calculated over a third period of time, and wherein the third period of time is greater than the first and second periods of time;

comparing the difference to a threshold wherein the difference exceeding the threshold is indicative of the anomaly in the signal;
   if the difference exceeds the threshold, performing an action wherein performing the action requires a relative increase in power consumption; and
   transmitting an alert signal or a portion of the signal indicating when the difference exceeds the threshold.

10. The computer readable storage medium of claim 9, wherein the second period of time can begin later or differ in duration as compared to the first period of time.

11. The computer readable storage medium of claim 9, wherein the operations further comprise, calculating the threshold based on the set of statistics which model the signal.

12. The computer readable storage medium of claim 9, wherein the action comprises at least one of sending an alert to a base unit or at least a portion of the signal to the base unit.

13. The computer readable storage medium of claim 9, further comprising calculating the set of statistics which models by calculating at least one of a mean of the signal, a variance of the signal, or a variance of the autocorrelation of the signal; and
   wherein calculating the first plurality of values comprises calculating at least one of an average of the mean of the signal over the first period of time, an average of the variance of the signal over the first period of time, a variance of the mean of the signal over the first period of time, and a variance of the variance of the signal over the first period of time;
   calculating the second plurality of values comprises calculating at least one of an average of the mean of the signal over the second period of time, an average of the variance of the signal over the second period of time, a variance of the mean of the signal over the second period of time, and a variance of the variance of the signal over the second period of time; and
   calculating the third plurality of values comprises calculating at least one of an average of the variance of the autocorrelation of the signal over the first and second periods of time or a variance of the variance of the autocorrelation of the signal over the first and second periods of time.

14. An apparatus for detecting an anomaly in a signal, comprising:
   a sensor; and
   a signal processing unit coupled with the sensor, wherein the signal processing unit performs operations comprising:
   calculating a first plurality of values based on a set of statistics which model the signal, wherein the first plurality of values is calculated over a first period of time;
   calculating a second plurality of values based on the set of statistics which model the signal, wherein the second plurality of values is calculated over a second period of time;
   calculating a third plurality of values, wherein the third plurality of values is calculated using first plurality of values and the second plurality of values and wherein the third plurality of values is calculated based on at least an autocorrelation of the signal;
   calculating a difference between at least one of the third plurality of values and a corresponding long-term value, wherein the long-term value is calculated over a third period of time, and wherein the third period of time is greater than the first and second periods of time;

comparing the difference to a threshold, wherein the difference exceeding the threshold is indicative of the anomaly in the signal;

if the difference exceeds the threshold, performing an action wherein performing the action requires an increase in power consumption; and transmitting an alert signal or a portion of the signal indicating when the difference exceeds the threshold.

15. The apparatus of claim 14, further comprising a storage device coupled to the signal processing unit, wherein at least a portion of the signal is stored by the signal processing unit in the storage device.

16. The apparatus of claim 14, wherein the system further comprises a signal transmission device coupled with the signal processing unit, and wherein the action comprises transmitting data.

17. The apparatus of claim 16, wherein data comprises at least one of an alert or a portion of the signal.

18. The apparatus of claim 14, wherein the operations further comprise, calculating the threshold based on the set of statistics which model the signal.

19. The apparatus of claim 14, further comprising calculating the set of statistics which models by calculating at least one of a mean of the signal, a variance of the signal, or a variance of the autocorrelation of the signal.

20. The apparatus of claim 19, wherein:

the operation of calculating the first plurality of values comprises calculating at least one of an average of the mean of the signal over the first period of time, an average of the variance of the signal over the first period of time, a variance of the mean of the signal over the first period of time, and a variance of the variance of the signal over the first period of time;

the operation of calculating the second plurality of values comprises calculating at least one of an average of the mean of the signal over the second period of time, an average of the variance of the signal over the second period of time, a variance of the mean of the signal over the second period of time, and a variance of the variance of the signal over the second period of time; and the operation of calculating the third plurality of values comprises calculating at least one of an average of the variance of the autocorrelation of the signal over the first and second periods of time or a variance of the variance of the autocorrelation of the signal over the first and second periods of time.

* * * * *